(12) United States Patent
Wilkerson

(10) Patent No.: US 9,860,098 B2
(45) Date of Patent: Jan. 2, 2018

(54) ULTRA LOW POWER WIDEBAND NON-COHERENT BINARY PHASE SHIFT KEYING DEMODULATOR USING FIRST ORDER SIDEBAND FILTERS WITH PHASE ZERO ALIGNMENT

(71) Applicant: Benjamin P. Wilkerson, Incheon (KR)

(72) Inventor: Benjamin P. Wilkerson, Incheon (KR)

(73) Assignee: Benjamin P. Wilkerson, Incheon (KR)

( * ) Notice: Subject to any disclaimer, the term of this patent is extended or adjusted under 35 U.S.C. 154(b) by 0 days.

(21) Appl. No.: 15/441,946

(22) Filed: Feb. 24, 2017

(65) Prior Publication Data
US 2017/0171007 A1  Jun. 15, 2017

Related U.S. Application Data

(63) Continuation of application No. PCT/KR2015/008835, filed on Aug. 24, 2015.

(30) Foreign Application Priority Data

Aug. 25, 2014 (KR) .................. 10-2014-0110741

(51) Int. Cl.
*H04L 27/233* (2006.01)
*H04L 27/00* (2006.01)

(52) U.S. Cl.
CPC ...... *H04L 27/2331* (2013.01); *H04L 27/0014* (2013.01); *H04L 27/2334* (2013.01); *H04L 2027/0036* (2013.01)

(58) Field of Classification Search
CPC . H03D 3/006; H04L 27/2272; H04L 27/0014; H04L 27/2334; H04L 2027/0036
See application file for complete search history.

(56) References Cited

U.S. PATENT DOCUMENTS

2010/0182079 A1*  7/2010  Shiue ............... H03D 3/006
                                                    329/304
2010/0277234 A1* 11/2010  Luo ................. A61N 1/3727
                                                    329/307

FOREIGN PATENT DOCUMENTS

JP       2931454 B2    8/1999
KR    10-0365982 B1    2/2003
         (Continued)

OTHER PUBLICATIONS

International Search Report dated Dec. 4, 2015 for International Application No. PCT/KR2015/008835.

*Primary Examiner* — David S Huang
(74) *Attorney, Agent, or Firm* — Typha IP LLC

(57) ABSTRACT

An embodiment of the present invention relates to an ultra low power wideband asynchronous binary phase shift keying (BPSK) demodulation method and a circuit configuration thereof. The ultra low power wideband asynchronous BPSK demodulation circuit comprises a sideband division and upper sideband signal delay unit dividing a modulated signal into an upper sideband and a lower sideband by a first order high-pass filter and a first order low-pass filter; a data demodulation unit latching, through a hysteresis circuit, a signal generated by a difference between the analog signals in which a phase difference between the delayed upper sideband analog signal and the lower sideband analog signal is aligned at 0°, so as to demodulate digital data; and a data clock recovery unit for generating a data clock by using a signal digitalized from the lower sideband analog signal through a comparator and a data signal.

5 Claims, 3 Drawing Sheets

BPSK demodulation scheme

(56) References Cited

FOREIGN PATENT DOCUMENTS

| KR | 10-1167023 B1 | 7/2012 |
|---|---|---|
| KR | 10-2013-0086494 A | 8/2013 |
| KR | 10-1414288 B1 | 7/2014 |
| KR | 10-1414289 B1 | 7/2014 |
| KR | 10-1414342 B1 | 7/2014 |

* cited by examiner

ULTRA LOW POWER WIDEBAND NON-COHERENT BINARY PHASE SHIFT KEYING DEMODULATOR USING FIRST ORDER SIDEBAND FILTERS WITH PHASE ZERO ALIGNMENT

CROSS REFERENCE TO RELATED APPLICATIONS

This is a Continuation of International Application No. PCT/KR2015/008835, filed on Aug. 24, 2015, which claims priority under 35 U.S.C. §119 to Korean Application No. 10-2014-0110741, filed on Aug. 25, 2014, the entire contents of both of which are hereby incorporated herein by reference.

BACKGROUND OF THE INVENTION

1. Field of the Invention

The present invention relates to an ultra low power wideband non-coherent BPSK demodulation method, and the structure of their circuit to demodulate data to align the phase 0° difference between the output signal of $1^{st}$ order sideband filter that passes lower sideband and the delayed signal that is delayed with $\pi/2$ period of carrier frequency from the output signal of $1^{st}$ order sideband filter that passes upper sideband.

2. Background of the Invention

BPSK (Binary Phase Shift Keying) signal which is double sideband suppressed carrier signal is used with coherent BPSK demodulation method to synchronize by a carrier signal that is regenerated with an internal oscillator.

BPSK demodulation is basically used by COSTAS loop that is complicated circuit to consume a heavily power and to limit a transmission speed, because it uses a feed-back loop with internal oscillator. Non-coherent DPSK demodulation circuit to use an analog integrator and switched-capacitor units, is used with an internal oscillator and an analog integrator that are used heavy power consumption and complicated circuits to use large area in chip, and has a drawback to discard whole packet data even one error in the packet occurred.

According to a BPSK demodulation circuit, Korean registered patent KR-100365982 mentioned about a stable modulation and demodulation circuits to use synchronous signal generator in demodulation unit. According PSK demodulation circuit, Korean registered patent KR-101167023 mentioned about a non-coherent demodulation method that has no internal oscillator.

SUMMARY OF THE INVENTION

According to an embodiment, the present invention relates to an ultra low power wideband non-coherent binary phase shift keying (BPSK) demodulation method, and the structure of their circuit.

The structure of the BPSK demodulation circuit comprises: a sideband separation and upper sideband signal delay unit for separating a modulated signal into an upper sideband and a lower sideband through a first order high pass filter and first order low pass filter in which a blocking frequency is same as a carrier frequency, and outputting a lower sideband analog signal and an analog signal delayed as much as ¼ period of a carrier frequency from an upper sideband analog signal; a data demodulation unit for demodulating digital data by latching a signal generated by a difference in the analog signals through a hysteresis circuit since the delayed upper sideband analog signal and lower sideband analog signal are arranged with a phase 0° difference, wherein the signal generated by a difference in the analog signals is an analog pulse signal shown corresponding to a phase changing part of a BPSK modulation signal; and a data clock recovering unit for generating a data clock by using a data signal and a signal digitalized from the lower sideband analog signal through a comparing unit.

DESCRIPTION OF ILLUSTRATIVE EMBODIMENT

Figure 1:
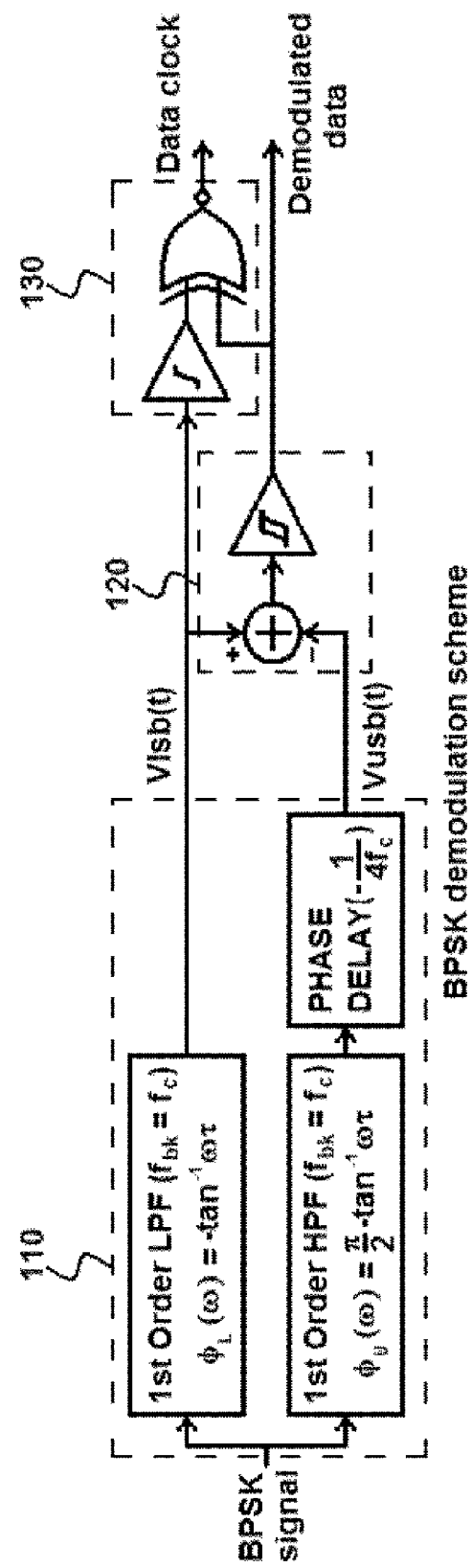
FIG. 1 is a circuit diagram to describe the structure of an ultra low power wideband non-coherent BPSK demodulator in accordance with an embodiment of the present invention.

According to the embodiment, the present invention provides BPSK demodulation circuit and its method for solving problems such as complicated circuit problem, transmission speed problem, and power consumption problem in conventional BPSK demodulation method.

Also, the present invention provides simple non-coherent BPSK demodulation circuit and their method to transmit wideband digital data in ultra low power.

According to the embodiment, the present invention provides an ultra low power non-coherent BPSK demodulation circuit which consists of a sideband separation and upper sideband signal delay unit, that separates upper sideband by $1^{st}$ high-pass filter with cutoff frequency same as carrier frequency and lower sideband by $1^{st}$ low-pass filter with cutoff frequency same as carrier frequency, and generates analog signal to be delayed from upper sideband analog signal with ¼ period or $\pi/2$ of carrier frequency; a data demodulation unit that demodulates digital data by latching positive pulse and negative pulse through a hysteresis circuit, because of aligning in phase 0° difference between above delayed upper sideband analog signal and above lower sideband analog signal; a data clock recovery unit that generates data clock using the data signal and digitized signal is from above lower sideband analog signal by comparator.

According to one side, the sideband separation and upper sideband signal delay unit includes a $1^{st}$ order HPF to separate upper sideband analog signal and a $1^{st}$ order LPF to separate lower sideband analog signal, from the BPSK modulated signal.

Also, the unit includes a delay circuit to delay with preset phase from the upper sideband analog signal.

According to another side, the data demodulation unit includes a subtracter to generate the positive and negative pulses which appear in phase changing edge to be based on the difference of analog signals, because of aligning in phase 0° difference between above delayed upper sideband analog signal and above lower sideband analog signal.

Also, digital data signal is generated by Schmitt trigger which has hysteresis to latch analog pulse signal that is generated by the subtracter.

According to another side, the data clock recovery unit includes a comparator to digitize from above lower sideband signal, and can synchronize by data clock signal is recovered by an exclusive-NOR with the input signals such as above digital data signal and the digitized signal by the comparator.

According to the embodiment, the present invention provides an ultra low power non-coherent BPSK demodulation method which consists of a sideband separation and upper sideband signal delayed stage, that separates upper sideband by $1^{st}$ high-pass filter with cutoff frequency same as carrier frequency and lower sideband by $1^{st}$ low-pass filter with cutoff frequency same as carrier frequency, and generates analog signal to be delayed from upper sideband analog signal with ¼ period or $\pi/2$ of carrier frequency; a data demodulation stage that demodulates digital data by latching positive and negative pulses through the hysteresis circuit, because of aligning in phase 0° difference between above delayed upper sideband analog signal and above lower sideband analog signal; a data clock recovery stage that generates data clock signal is recovered by exclusive-NOR with the input signals such as recovered data signal and digitized signal is from above lower sideband analog signal by comparator.

According to the embodiment, the present invention provides a simple non-coherent BPSK demodulation circuit and their method to transmit wideband digital data for consuming an ultra low power.

Not only that, the present invention provides the demodulation method to be applied in high speed digital and mobile communication systems which are required ultra low power consumption, and to be easily implemented in a low cost system on chip (SoC).

Below the embodiment, the present invention encompasses the details of the BPSK demodulation circuit topology and its method referring attached figures.

Referring now to FIG. 1, the circuit diagram of this invention for describing an ultra low power wideband non-coherent BPSK demodulation topology is shown in it. In the circuit same as in FIG. 1, the BPSK circuit is comprised of a sideband separation and upper sideband signal delay unit 110, a data demodulation unit 120, and a data clock recovery unit 130.

First of all, the outputs of a sideband separation and upper sideband signal delay unit 110 are a lower sideband analog signal and a phase delayed analog signal from upper sideband analog signal, when a modulation signal for input of the unit is separated to an upper sideband (USB) and a lower sideband (LSB) for sideband analog signals. In this case, the sideband separation is composed of $1^{st}$ order filters whose cutoff frequency is same as carrier frequency, and a lower sideband signal and an upper sideband signal are acquired by $1^{st}$ order low-pass filter and $1^{st}$ order high-pass filter, and a delay circuit to delay with preset phase from upper sideband analog signal. In this unit, the delayed signal can be achieved even the $1^{st}$ order high-pass filter and the delay circuit are swapped.

In this case, the upper sideband analog signal that is from the output of $1^{st}$ order filter, is occurred as fast as $\pi/2$ or ¼ period of carrier frequency rather than the lower sideband analog signal, and the delayed upper sideband signal is occurred through the delay circuit to delay $\pi/2$ or ¼ period of carrier frequency for finding phase changing edge with aligning phase 0° difference between the delayed upper sideband signal and the lower sideband signal.

Second of all, a data demodulation unit 120 consists of a subtracter to generate positive pulses and negative pulses to be occurred in phase changing edge by the difference of that aligns phase 0° difference between the delayed upper sideband signal and the lower sideband signal.

And it consists of a hysteresis circuit such as Schmitt trigger to demodulate digital data by latching an analog pulse signal that is from the subtracter, through the circuit of hysteresis.

Third of all, a data clock recovery unit 130 consists of the comparator and the exclusive-NOR gate that are shown in the figure.

In this case, a digitized signal is occurred in the output of the comparator when the its input is set to an analog signal that is from the output of above $1^{st}$ order LPF, and a data clock is discovered through the function of an exclusive-NOR with the digitized signal and above demodulated data signal.

Figure 2:
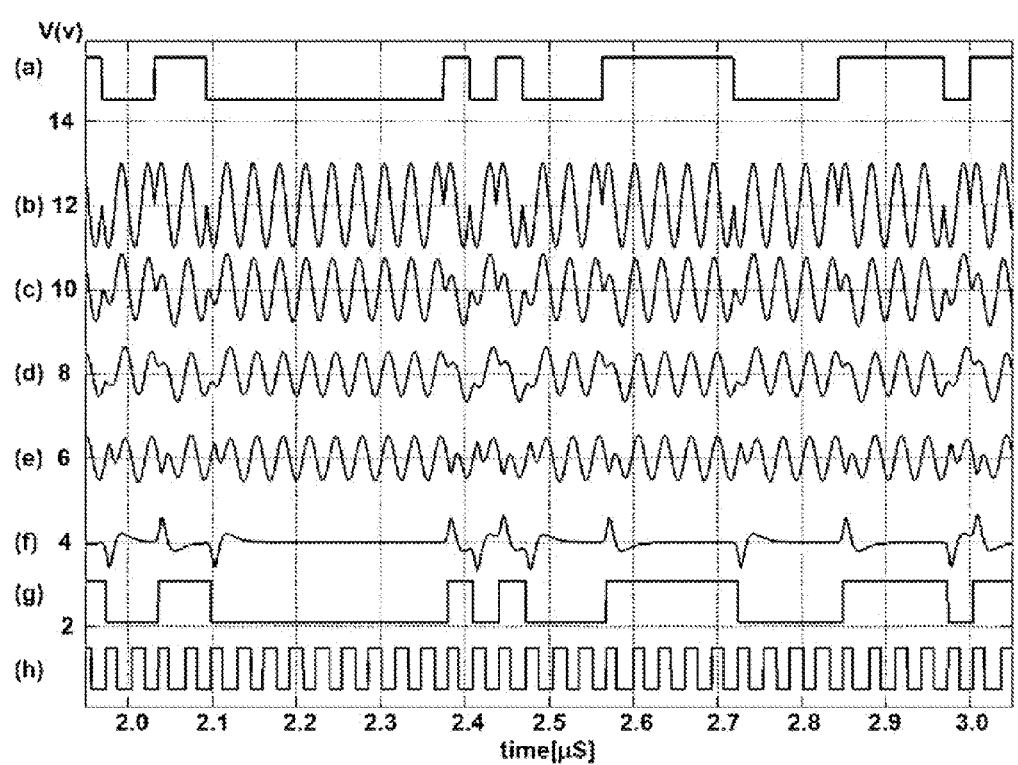
FIG. 2 is a timing diagram illustrating signals such as transmitter side signals that are included random data and a BPSK modulated signal in 32 MHz carrier frequency, and receiver side signals in accordance with an embodiment of the present invention.

Referring additionally now to FIG. 2, the timing diagrams of this invention with the random data of 32 Mbps transfer rate, transmitter side signal to modulate in BPSK using the random data and 32 MHz frequency carrier, and the signals which are processed the BPSK demodulation of receiver side are shown in it.

In the description of graphs from above to below, graph (a) is described as a random data signal to be modulated in transmitter side, graph (b) is described as a phase shift keying modulation signal to be measured in transmitter side, and graph (c) is described as a band-limited BPSK signal through a resonance circuit in receiver side.

Also, graph (d) is described as the analog output signal of $1^{st}$ order low-pass filter ($1^{st}$ order LPF), graph (e) is described as a delayed analog signal to be delayed with $\pi/2$ or ¼ period of carrier frequency from the output of $1^{st}$ order high-pass filter ($1^{st}$ order HPF), and graph (f) is described as an analog pulse signal that includes positive pulse and negative pulse to be generated by subtracting from the analog output signal of $1^{st}$ order low-pass filter to the delayed analog signal that is delayed from the output of $1^{st}$ order high-pass filter for demodulating data.

And also, graph (g) is described as a data signal to be demodulated by latching through Schmitt trigger that has a hysteresis characteristic from an analog pulse signal that is the output of the subtracter, and finally graph (h) is described as a data clock signal to be recovered.

Each illustrated signal appears in a typically clear signal, and the demodulated signal is confirmed in a precise signal. For a practical technology that is used in 0.18 μm technology, for example, a high speed operation over 1 Gbps can be actualized in the demodulation method for even more speed.

Figure 3:
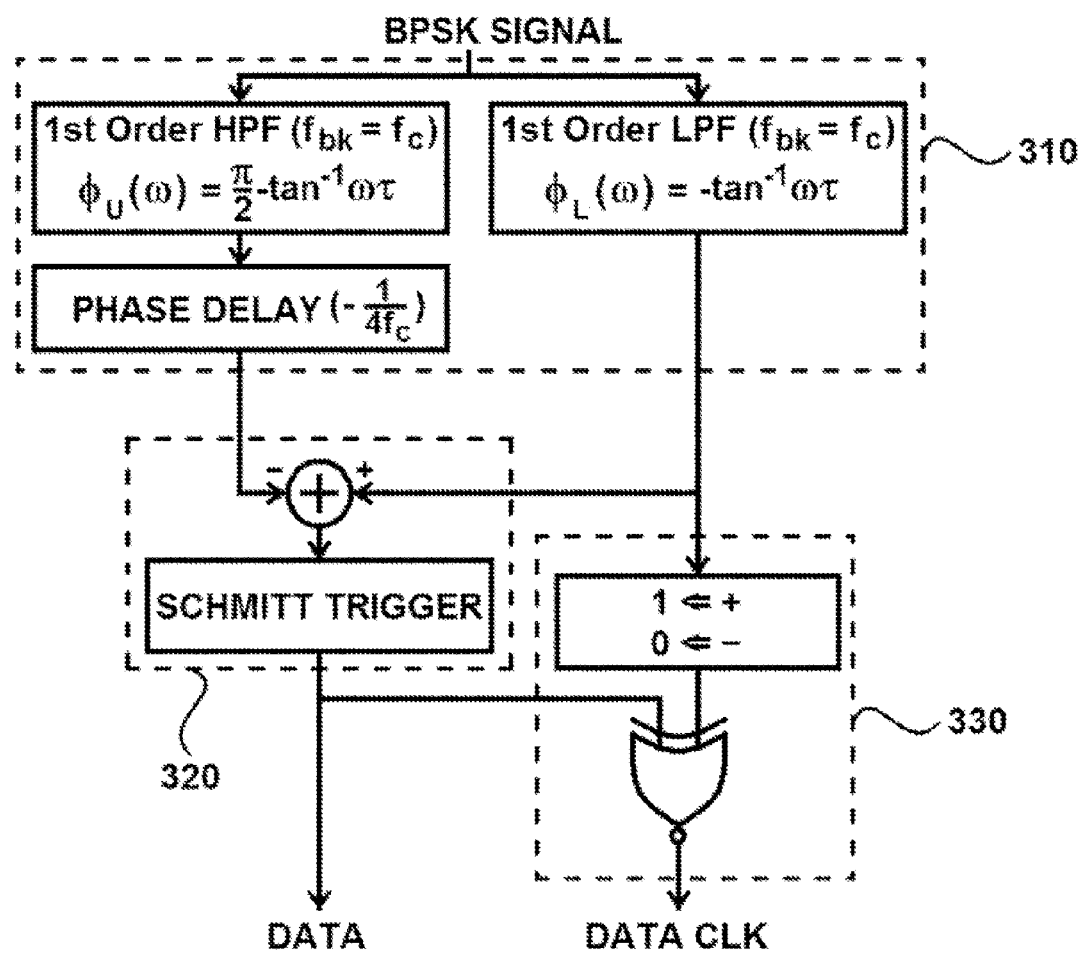
FIG. 3 is a flowchart to describe the demodulation method in an ultra low power wideband non-coherent BPSK demodulator in accordance with an embodiment of the present invention.

Referring additionally now to FIG. 3, the flowchart of this invention for describing a demodulation method to be performed in an ultra low power wideband non-coherent BPSK demodulation circuit is shown in it, and each stage can be conducted through the structure of a BPSK demodulation circuit that describes in FIG. 1.

In stage (310), an upper sideband and a lower sideband are separated from the modulated signal by a $1^{st}$ HPF and a $1^{st}$ LPF that separates each sideband analog signals for an upper sideband and a lower sideband, and this stage outputs a lower sideband analog signal and a delayed analog signal to be delayed with preset phase from an upper sideband analog signal. In this stage, the delayed signal can be achieved even the $1^{st}$ order high-pass filter and the delay circuit are swapped.

In this stage, the upper sideband analog signal is occurred as fast as $\pi/2$ or ¼ period of carrier frequency rather than the lower sideband analog signal, and the delayed upper sideband signal is occurred through the delay circuit to delay π/2 or ¼ period of carrier frequency for finding phase changing edge with aligning phase 0° difference between the delayed upper sideband signal and the lower sideband signal.

In stage (320), an analog pulse signal which is constructed with positive and negative pulses, is occurred in phase changing edge by the difference of the analog signals, because the upper sideband delayed and the lower sideband analog signals of stage (310) are aligned in phase 0°.

By latching above analog pulse signal through Schmitt trigger that has a hysteresis characteristic, the digital data can be demodulated.

Finally, in stage (330), a digital clock is recovered by an exclusive-NOR gate whose inputs are a signal that is digitized from the lower sideband analog signal among the outputs of stage (310) by a comparator, and the digital data that is demodulated in stage (320).

By the illustrative embodiment of this invention, the non-coherent BPSK demodulation circuit and its method that work to transmit a wideband digital data, in an ultra low power and simple circuitry, are offered.

On top of that, the demodulation method to implement in digital communication and mobile communication device for consuming ultra low power is provided, also it applies a system on chip (SoC) in low cost.

Through the embodiment of the invention, a non-coherent BPSK demodulation method can be embodied in program instruction forms to be conducted by various computing methods, and saved in a computer readable media. The computer readable media can be included in stand alone or combination with data structure, data file and program instruction. The program instruction to be saved in above media will be possible to use what is constructed and specially designed, or announced by ordinary skilled of computer software for the embodiment. The examples of the computer readable recording media are a floppy disk, a hard disk, a magnetic media such as magnetic tape, an optical media such as DVD and CD-ROM, a magneto-optical media such as a floptical disk, and a particularly designed hardware device such as RAM, ROM and a flash memory to be saved and performed by program instruction. In the example of program instruction, it includes with a machine code that is constructed by a compiler, also a high level language to be executed using an interpreter by a computer. Above hardware device is organized to be operated into more than one software module for performing the operation of the embodiment, and the opposite is also.

While the invention has been particularly shown and described with reference to the preferred embodiments in the system, the structure, the device and the circuit thereof, it will be understood by those skilled in the art that the foregoing and other changes in form, and details may be made therein without departing from the spirit and scope of the invention.

Therefore, another embodiments, another examples, and claims that are equivalent, are covered in the scope of following claims.

What is claimed is:

1. An ultra low power wideband non-coherent binary phase shift keying (BPSK) demodulation circuit using first order sideband filters with phase zero alignment, the ultra low power wideband non-coherent BPSK demodulation circuit comprises:
    a sideband separation and upper sideband signal delay unit to output a lower sideband analog signal and a phase delayed analog signal to be delayed with preset phase from upper sideband analog signal, when a modulation signal in the input of the unit is divided to an upper sideband and a lower sideband by $1^{st}$ order filters whose cutoff frequency is same as carrier frequency;
    a data demodulation unit to demodulate digital data through a hysteresis circuit that latches an analog pulse signal to appear in the phase changing edge of BPSK modulation signal, in accordance with a phase difference between the lower sideband analog signal and the phase delayed analog signal being set to phase 0°; and
    a data clock recovery unit to recover data clock using a digitized signal from the lower sideband analog signal and the demodulated digital data,
    wherein the sideband separation and upper sideband signal delay unit comprises:
        a $1^{st}$ order low-pass filter ($1^{st}$ order LPF) whose cutoff frequency is the same as carrier frequency, configured to isolate lower sideband from the modulation signal;
        a $1^{st}$ order high-pass filter ($1^{st}$ order HPF) whose cutoff frequency is the same as carrier frequency, configured to isolate upper sideband from the modulation signal; and
        a delay circuit to delay with preset phase from upper sideband analog signal that is the output of the $1^{st}$ order HPF,
    wherein the data demodulation unit comprises:
        a subtracter to generate an analog pulse signal to appear in the phase changing edge of the modulation signal, the edge being caused by the difference of analog signals which are the lower sideband analog signal and the phase delayed analog signal in accordance with the phase difference between the analog signals being set to phase 0°; and
        a Schmitt trigger that is a hysteresis circuit to demodulate digital data by latching the analog pulse signal,
    wherein the data clock recovery unit comprises:
        a comparator to digitize from the lower sideband analog signal; and
        an exclusive-NOR gate to compare the digitized lower sideband analog signal with the demodulated digital data signal, and
    wherein the upper sideband analog signal that is from the output of $1^{st}$ order filter, occurs faster than the lower sideband analog signal by π/2 or ¼ period of carrier frequency, and the phase delayed analog signal occurs through the delay circuit to delay π/2 or ¼ period of carrier frequency for finding phase changing edge with aligning phase 0° difference between the phase delayed analog signal and the lower sideband analog signal.

2. The ultra low power wideband non-coherent BPSK demodulation circuit of claim 1, wherein the sideband separation and upper sideband signal delay unit comprises a $1^{st}$ order HPF that isolates upper sideband, a $1^{st}$ order LPF that isolates lower sideband, and a delay circuit, wherein the output of the $1^{st}$ order HPF whose cutoff frequency is the same as carrier frequency, is an upper sideband analog signal that is π/4 or ⅛ period faster than the BPSK modulation signal, and a delayed upper sideband analog signal that is generated by the delay circuit to delay π/2 or ¼ period of carrier frequency from the upper sideband analog signal, is π/4 or ⅛ period slower than the BPSK modulation signal, and the output of the $1^{st}$ order LPF whose cutoff frequency is the same as carrier frequency, is a lower sideband analog signal that is $\pi/4$ or ⅛ period slower than the BPSK modulation signal, and wherein the phase changing edge of the BPSK modulation signal in the phase 0° difference between the phase delayed analog signal and the lower sideband analog signal is found in stable by a phase difference between the 1$^{st}$ order HPF's output signal and the 1$^{st}$ order LPF's output signal being maintained to $\pi/2$ in a range from upper sideband to lower sideband, and the phase delayed analog signal being aligned to the lower sideband analog signal with phase 0° difference.

3. The ultra low power wideband non-coherent BPSK demodulation circuit of claim 1, wherein the data demodulation unit comprises a subtracter and a Schmitt trigger that is a hysteresis circuit, wherein digital data is demodulated by latching an analog pulse signal that consists of positive and negative pulses which appear in phase changing edge based on difference of analog signals, by aligning in phase 0° difference between the phase delayed analog signal and the lower sideband analog signal.

4. The ultra low power wideband non-coherent BPSK demodulation circuit of claim 1, wherein the data clock recovery unit comprises a comparator and an exclusive-NOR gate, wherein a data clock is recovered through the calculation of the exclusive-NOR gate with the digital data signal and a digital to be digitized from the lower sideband analog signal.

5. An ultra low power wideband non-coherent binary phase shift keying (BPSK) demodulation method using first order sideband filters with phase zero alignment, the ultra low power wideband non-coherent BPSK demodulation method comprises:

a sideband separation and upper sideband signal delay step to output a lower sideband analog signal and a phase delayed analog signal to be delayed with preset phase from upper sideband analog signal, when a modulation signal in the input of the stage is divided to an upper sideband and a lower sideband by 1$^{st}$ order filters whose cutoff frequency is same as carrier frequency;

a data demodulation step to demodulate digital data through a hysteresis circuit that latches an analog pulse signal to appear in the phase changing edge of BPSK modulation signal, in accordance with a phase difference between the lower sideband analog signal and the phase delayed analog signal being set to phase 0°; and a data clock recovery step to recover data clock using a digitized signal from the lower sideband analog signal and above demodulated digital data, wherein the sideband separation and upper sideband signal delay step comprises:

a step to isolate lower sideband from the modulation signal by a 1$^{st}$ order low-pass filter (1$^{st}$ order LPF) whose cutoff frequency is the same as carrier frequency;

a step to isolate upper sideband from the modulation signal by 1$^{st}$ order high-pass filter (1$^{st}$ order HPF) whose cutoff frequency is the same as carrier frequency; and a delay step to delay with preset phase from upper sideband analog signal that is the output of the 1$^{st}$ order HPF, the data demodulation step comprises:

a step to generate an analog pulse signal to appear in the phase changing edge of the modulation signal by a subtracter, and the edge is caused by the difference of analog signals which are the lower sideband analog signal and the delayed upper sideband analog signal because the phase difference between the analog signals is set to phase 0°; and a step to demodulate digital data through latching the analog pulse signal by a Schmitt trigger that is a hysteresis circuit, wherein the data clock recovery step comprises:

a step to convert a digital signal from the lower sideband analog signal by a comparator; and a step to recover a data clock for comparing the converted lower sideband analog signal with the demodulated digital data by an exclusive-NOR gate, and wherein the upper sideband analog signal that is from the output of 1$^{st}$ order filter, occurs faster than the lower sideband analog signal by $\pi/2$ or ¼ period of carrier frequency, and the phase delayed analog signal occurs through the delay circuit to delay $\pi/2$ or ¼ period of carrier frequency for finding phase changing edge with aligning phase 0° difference between the phase delayed analog signal and the lower sideband analog signal.

* * * * *